(12) United States Patent
Oda (10) Patent No.: US 7,672,700 B2
(45) Date of Patent: Mar. 2, 2010

(54) PORTABLE INFORMATION TERMINAL

(75) Inventor: Akinori Oda, Higashiyamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1109 days.

(21) Appl. No.: 10/932,075

(22) Filed: Sep. 2, 2004

(65) Prior Publication Data

US 2005/0208799 A1 Sep. 22, 2005

(51) Int. Cl.
*H04M 1/00* (2006.01)
(52) U.S. Cl. ................. 455/575.4; 455/556.1
(58) Field of Classification Search ............... 455/90.3, 455/550.1, 556.1, 575.1–575.9
See application file for complete search history.

(56) References Cited

U.S. PATENT DOCUMENTS

| | | | | |
|---|---|---|---|---|
| 6,667,731 | B2 * | 12/2003 | Park | 345/102 |
| 7,003,318 | B2 * | 2/2006 | Kota et al. | 455/556.1 |
| 2004/0087353 | A1 * | 5/2004 | Satoh et al. | 455/575.3 |
| 2004/0198437 | A1 * | 10/2004 | Yamamoto et al. | 455/556.1 |
| 2004/0198477 | A1 * | 10/2004 | Jung et al. | 455/575.4 |

FOREIGN PATENT DOCUMENTS

| | | |
|---|---|---|
| JP | 2002-261888 | 9/2002 |
| JP | 2003-179678 | 6/2003 |
| JP | 2003-283621 | 10/2003 |
| JP | 2003-298699 | 10/2003 |

OTHER PUBLICATIONS

Final Notice of Rejection issued by the Japanese Patent Office on Sep. 19, 2006, for Japanese Patent Application No. 2004-083582, and English-language translation thereof.
Notification of Reasons for Rejection issued by the Japanese Patent Office, mailed Jan. 24, 2006, for Japanese Patent Application No. 2004-083582, and English-language translation thereof.
Notification of Reasons for Rejection issued by the Japanese Patent Office, mailed Jan. 24, 2006, for Japanese Patent Application No. 2004-083582, and English-language translation thereof.

* cited by examiner

*Primary Examiner*—Nick Corsaro
*Assistant Examiner*—Vladimir Magloire
(74) *Attorney, Agent, or Firm*—Finnegan, Henderson, Farabow, Garrett & Dunner, L.L.P.

(57) ABSTRACT

A portable information terminal includes a first unit, a second unit, an engaging mechanism configured to engage the second unit to be slidable with respect to the first unit, a locking mechanism configured to lock the second unit slid by the engaging mechanism at a intermediate position of a slidable range, a detect unit configured to detect a lock position where the second unit is locked, and a first control unit configured to launch a predetermined function unit in accordance with the lock position.

11 Claims, 6 Drawing Sheets

Intermediate position

FIG. 5A  Close position

FIG. 5B  Intermediate position

FIG. 5C  Open position

PORTABLE INFORMATION TERMINAL

CROSS-REFERENCE TO RELATED APPLICATIONS

This application is based upon and claims the benefit of priority from prior Japanese Patent Application No. 2004-083582, filed Mar. 22, 2004, the entire contents of which are incorporated herein by reference.

BACKGROUND OF THE INVENTION

1. Field of the Invention

The present invention relates to a portable information terminal with a structure in which a portion of a housing is slidable.

2. Description of the Related Art

In general, in downsizing a portable phone, a foldable structure which is foldable by forming a main body by two units, and coupling the two units via a pivotal coupling member, or a coupling slide structure which overlays two units by coupling one unit to the other unit via a slidable member is adopted. The slide structure couples a movable housing (second unit) that mounts some function units to a main housing (first unit) to be slidable in, e.g., the longitudinal direction (for example, Jpn. Pat. Appln. KOKAI Publication No. 2003-179678). A portable phone with such a slidable structure is retracted so that the two units are overlaid when it is carried. On the other hand, such a portable telephone is used upon talking so that the two units are slid in the longitudinal direction.

In the portable phone described in Jpn. Pat. Appln. KOKAI Publication No. 2003-179678, the effective region of a touch panel can be increased/decreased depending on whether the second unit is located at a closed position (retracted), ½ open position, or open position (extended). However, in the conventional portable phone, since the effective region of the touch panel is merely increased/decreased in accordance with a slide lock position, such a mechanism is not related to other functions.

BRIEF SUMMARY OF THE INVENTION

According to an embodiment of the present invention, there is provided a portable information terminal comprising a first unit, a second unit, an engaging mechanism configured to engage the second unit to be slidable with respect to the first unit, a locking mechanism configured to lock the second unit slid by the engaging mechanism at a intermediate position of a slidable range, a detect unit configured to detect a lock position where the second unit is locked, and a first control unit configured to launch a predetermined function unit in accordance with the lock position.

According to the present invention, when the second unit is slidably engaged with the first unit, and the second unit is slid and locked at an intermediate position of the slidable range, that lock position is detected, and a predetermined function is launched according to the lock position. Hence, a function can be automatically launched by sliding the second unit to the intermediate position without any normal function launch operation. That is, since a function can be automatically launched by a partial slide operation with respect to the movable housing, the operability can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described hereinafter with reference to the accompanying drawings.

Figure 1:
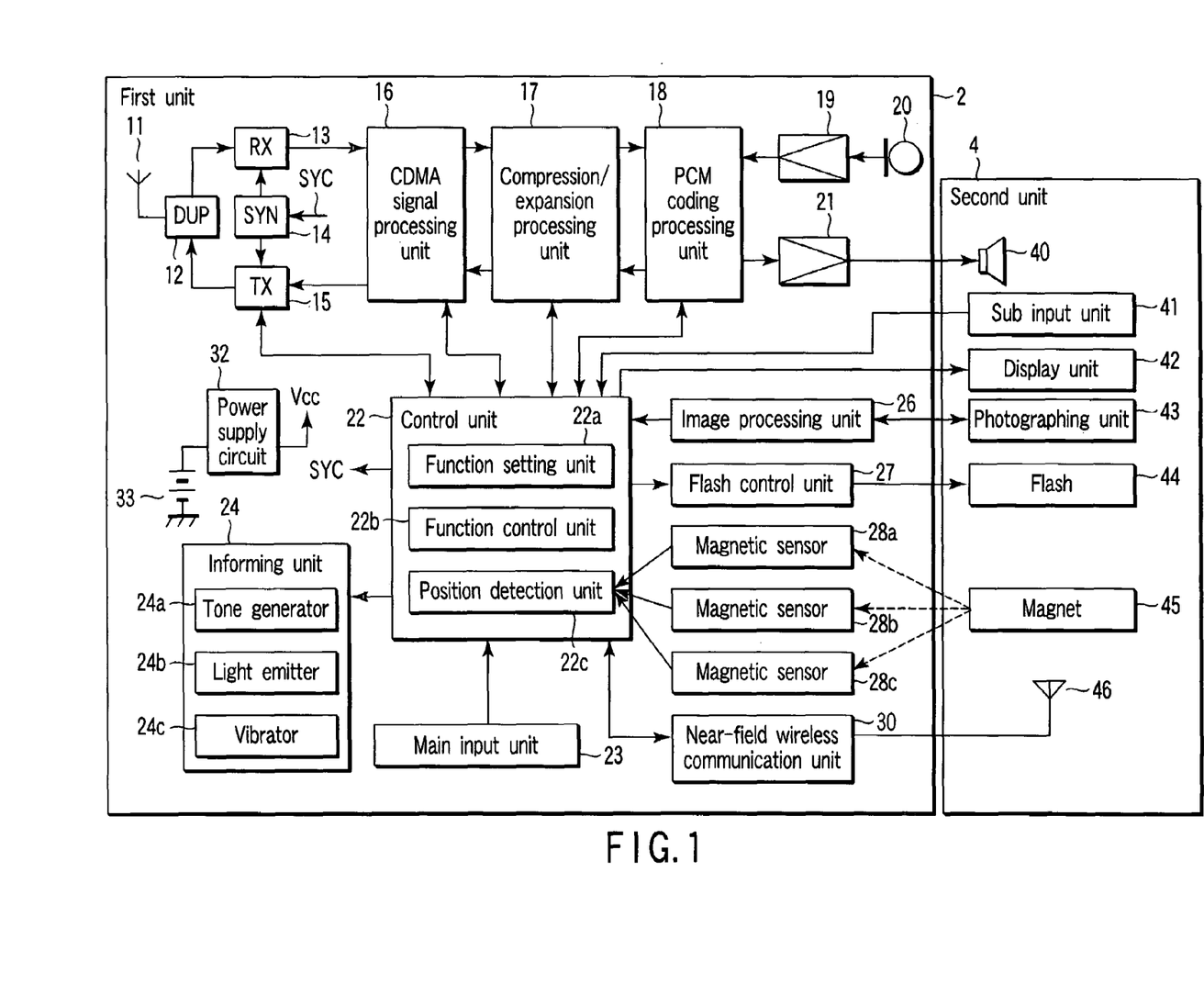
FIG. 1 is a block diagram showing the arrangement of a portable information terminal according to an embodiment of the present invention.

FIG. 1 is a block diagram showing the arrangement of a portable information terminal which is formed as a portable phone according to this embodiment.

As shown in FIG. 1, the portable information terminal according to this embodiment comprises two units, i.e., a first unit 2 and second unit 4. The first unit 2 is mounted with a principal circuit required to make wireless communication and control components of various functions. The second unit 4 is mainly mounted with input/output components and the like. The first and second units 2 and 4 are coupled via an engaging mechanism which slidably engages the second unit 4 with respect to the first unit 2. The engaging mechanism couples the second unit 4 to be slidable in, e.g., the longitudinal direction. The slide state of the second unit 4 with respect to the first unit 2 will be described later (FIGS. 2A to 2C, FIGS. 3A to 3C, FIGS. 4A to 4C, and FIGS. 5A to 5C).

The arrangement mounted in the first unit 2 will be described first.

A radio signal transmitted from a base station (not shown) is received by an antenna 11, and is input to a reception circuit (RX) 13 via an antenna duplexer (DUP) 12. The reception circuit 13 frequency-converts the reception radio signal to an RF signal by mixing it with a local oscillation signal output from a frequency synthesizer (SYN) 14. The circuit 13 then quadrature-demodulates this RF signal to output a received baseband signal. Note that the frequency of the local oscillation signal generated by the frequency synthesizer 14 is designated by a control signal SYC from a control unit 22.

The received baseband signal is input to a code division multiple access (CDMA) signal processing unit 16. The CDMA signal processing unit 16 comprises a RAKE receiver. The RAKE receiver despreads a plurality of paths included in the received baseband signal by spread codes. The despread path signals are mixed after their phases are locked. As a result, reception packet data of a predetermined transmission format is obtained. The reception packet data is input to a compression/expansion processing unit (to be referred to as a compander hereinafter) 17.

The compander 17 demultiplexes the reception packet data output from the CDMA signal processing unit 16 for respective media using a multiplexer/ demultiplexer. The compander 17 applies a decoding process for each demultiplexed media data. For example, when the reception packet data includes audio data, the compander 17 decodes this audio data by a speech codec. On the other hand, when the reception packet data includes video data, the compander 17 decodes this video data by a video codec. A digital audio signal obtained by this decoding process is input to a PCM code processing unit (to be referred to as a PCM codec hereinafter) 18. Also, a digital video signal is input to the control unit 22. Furthermore, when the reception packet data includes text data such as an e-mail message, this text data is input to the control unit 22.

The PCM codec 18 PCM-decodes the digital audio signal output from the compander 17 and outputs an analog audio signal. This analog audio signal is amplified by an incoming speech amplifier 21, and is then output from a loudspeaker 40.

The control unit 22 displays the digital video signal output from the compander 17 on an LCD of a display unit 42 using a video RAM. Also, the control unit 22 temporarily stores text data such as an e-mail message or the like in a storage unit (not shown), and also displays it on the LCD of the display unit 42. Note that the LCD of the display unit 42 displays telephone book information, the telephone number of a communication partner terminal, transmission/reception history, operation status of the self terminal, and the like in addition to the aforementioned transmission/reception data and the like.

An audio signal of a speaker input to a microphone 20 is amplified to an appropriate level by an outgoing speech amplifier 19. The amplified audio signal undergoes a PCM coding process by the PCM codec 18 to be converted into a digital audio signal, which is input to the compander 17. Also, a video signal sensed by a camera (not shown) is converted into a digital signal by the control unit 22, and is input to the compander 17. Note that text data of an e-mail message, which is created by the control unit 22, is also input from the control unit 22 to the compander 17.

The compander 17 detects the amount of energy of input speech from the digital audio signal output from the PCM codec 18, and determines a transmission data rate based on this detection result. The compander 17 encodes the digital audio signal to a signal of a format according to the transmission data rate, thereby generating audio data. Also, the compander 17 encodes the digital video signal output from the control unit 22 to generate video data. The compander 17 packetizes these audio and image data according to a predetermined format using the multiplexer/demultiplexer, and outputs transmission packet data to the CDMA signal processing unit 16. When text data such as an e-mail message or the like is output from the control unit 22, it is also multiplexed on the transmission packet data.

The CDMA signal processing unit 16 applies a spread spectrum process to the transmission packet data output from the compander 17 using spread codes assigned to a transmission channel. Then, the unit 16 outputs that output signal to a transmission circuit (TX) 15. The transmission circuit 15 modulates the spread spectrum signal using a digital modulation scheme such as QPSK or the like. The transmission circuit 15 frequency-converts the transmission signal generated by this modulation process into a radio signal by mixing it with a local oscillation signal generated by the frequency synthesizer 14. The transmission circuit 15 then RF-amplifies the radio signal to a transmission power level designated by the control unit 22. The amplified radio signal is supplied to the antenna 11 via the antenna duplexer 12, and is transmitted from this antenna 11 to the connected base station.

A main input unit 23 has keys assigned with various functions such as a transmission execution key, alphabet/kana/kanji/numeric input keys, input switch key, power on/off key, end key, and the like, and controls input operations to these keys.

An informing unit 24 is activated under the control of the control unit 22 upon reception of a call addressed to the self portable information terminal. The informing unit 24 includes a tone generator 24a that informs by generating an audible tone, a light-emitter 24b that informs by emitting light, a vibrator 24c that informs by producing vibrations using an eccentric motor or the like, and the like.

A power supply circuit 32 generates a predetermined operation power supply voltage Vcc on the basis of the output from a battery 33, and supplies it to the respective circuit units.

The first unit 2 includes an image processing unit 26 that controls a photographing unit 43 provided to the second unit 4 to photograph a still image or moving image, a flash control unit 27 that controls a flash 44 provided to the second unit 4 to emit flash light upon photographing a still image, a plurality of magnetic sensors (Hall elements) 28a, 28b, and 28c which are provided at predetermined positions to detect the slide (lock) position of the second unit 4, a near-field wireless communication unit 30 that controls near-field wireless communications complying with, e.g., Bluetooth.

The control unit 22 includes a function setting unit 22a, function control unit 22b, and position detection unit 22c in addition to the function of controlling the aforementioned units.

The function setting unit 22a sets a function to be launched in correspondence with the slide position of the second unit 4 with respect to the first unit 2. In this embodiment, the function setting unit 22a sets a function to be launched when the second unit 4 is located at an intermediate position (see FIGS. 3A to 3C) in accordance with a user's instruction. Note that the function setting unit 22a can similarly set functions in correspondence with both the close position (see FIGS. 2A to 2C) and open position (see FIGS. 4A to 4C) of the second unit 4. In this embodiment, the second unit 4 can be locked at only one position within the slidable range (details will be described later), but it may be locked at a plurality of positions. In this case, functions can be set in correspondence with these positions. The function setting unit 22a manages a plurality of settable functions which can be launched in correspondence with the slide positions, and sets a function to be launched from those functions in accordance with a user's designation.

The function control unit 22b launches the function set by the function setting unit 22a in correspondence with the clock position of the second unit 4 detected by the position detection unit 22c.

The position detection unit 22c detects the slide position and direction of the second unit 4 with respect to the first unit 2 in accordance with the outputs from the magnetic sensors 28a, 28b, and 28c. In this embodiment, the unit 22c detects the close position where the first and second units 2 and 4 are integrally overlaid, the intermediate position where the second unit 4 is locked at a position in the middle of the slidable range, and the open position where the second unit 4 is slid and locked at a slidable end portion on the basis of the outputs from the magnetic sensors 28a, 28b, and 28c.

When a plurality of lock positions are set as the intermediate position in place of only one position, magnetic sensors are respectively provided to these positions to detect if the second unit 4 is locked, and each lock position of the second unit 4 is detected based on the outputs from these magnetic sensors.

The arrangement mounted in the second unit 4 will be described below.

The second unit 4 includes a sub input unit 41, the display unit 42, the photographing unit (camera) 43, the flash 44, a magnet 45, a near-field wireless communication antenna 46, and the like.

The sub input unit 41 includes cross-cursor keys used to make cursor operations, a selection/execution key, and other keys. The sub input unit 41 is always operable even when the second unit 4 is located at the close position (in the state shown in FIGS. 2A to 2C to be described later), and an input operation to the main input unit 23 is disabled.

The display unit 42 comprises an liquid crystal display (LCD) or the like, and displays various kinds of information under the control of the control unit 22.

The photographing unit 43 includes a lens optical system which forms a photographing lens, a charge coupled device (CCD) as an image sensing element arranged behind the optical axis, a drive circuit, and the like, and photographs a still image or moving image under the control of the image processing unit 26. In this embodiment, the photographing unit 43 is usable when the second unit 4 is located at the open position.

The flash 44 emits flash light under the control of the flash control unit 27 upon photographing a still image by the photographing unit 43. In this embodiment, the flash 44 is usable when the second unit 4 is located at the open position.

The magnet 45 is used to detect the slide position of the second unit 4, and is arranged near, e.g., the end portion of the second unit 4.

The near-field wireless communication antenna 46 is used upon making wireless communications under the control of the near-field wireless communication unit 30, and is arranged near, e.g., the upper end portion in the housing of the second unit 4. More specifically, the antenna 46 is arranged at a position where a radio wave can be satisfactorily transmitted/received in a normal use form. By sliding the second unit 4 to the open position, the antenna can be separated from the first unit 2 including principal control circuits, and interference due to signals generated by respective control circuits can be reduced.

The outer appearance of the portable information terminal and the slide states of the second unit 4 in this embodiment will be described below with reference to FIGS. 2A to 2C, FIGS. 3A to 3C, FIGS. 4A to 4C, and FIGS. 5A to 5C.

Figure 2A:
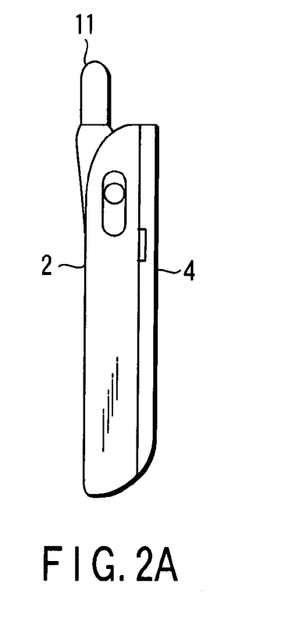
FIGS. 2A, 2B, and 2C are views showing the outer appearance of the portable information terminal at a close position at which first and second units 2 and 4 are integrally overlaid in the embodiment of the present invention.
Figure 2B:
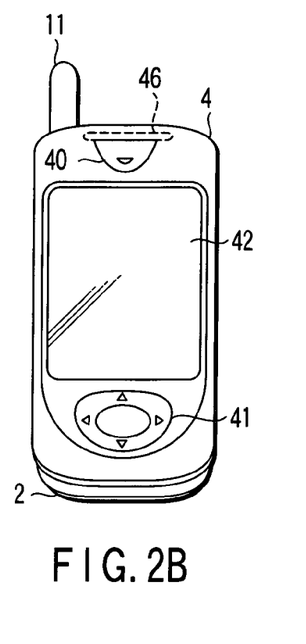
Figure 2C:
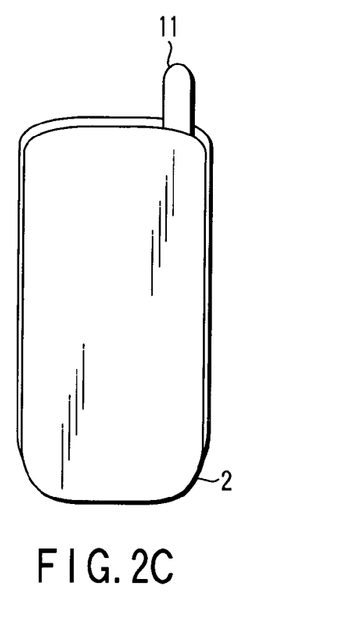

FIG. 2A is a side view of the portable information terminal at the close position where the first and second units 2 and 4 are integrally overlaid. FIGS. 2B and 2C are respectively a front view and a rear view thereof.

Figure 3A:
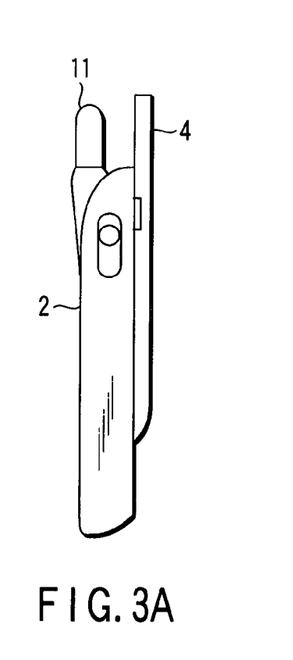
FIGS. 3A, 3B, and 3C are views showing the outer appearance of the portable information terminal after the second unit 4 is slid upward in the longitudinal direction with respect to the first unit 2 and is locked at an intermediate position in the embodiment of the present invention.
Figure 3B:
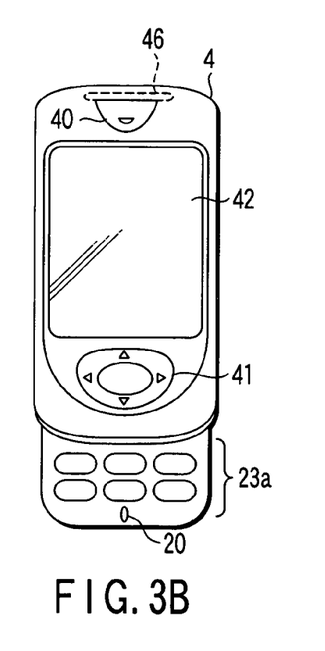
Figure 3C:
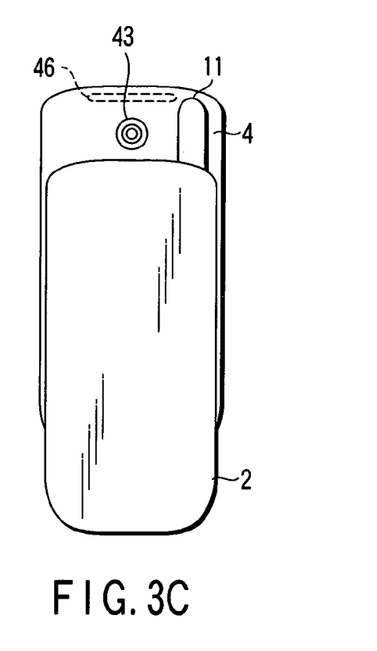

FIG. 3A is a side view of the portable information terminal when the second unit 4 is slid upward in the longitudinal direction with respect to the first unit 2 and is locked at the intermediate position. FIGS. 3B and 3C are respectively a front view and a rear view thereof.

Figure 4A:
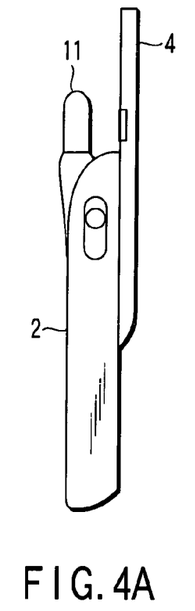
FIGS. 4A, 4B, and 4C are views showing the outer appearance of the portable information terminal after the second unit 4 is slid upward in the longitudinal direction with respect to the first unit 2 and is locked at an open position in the embodiment of the present invention.
Figure 4B:
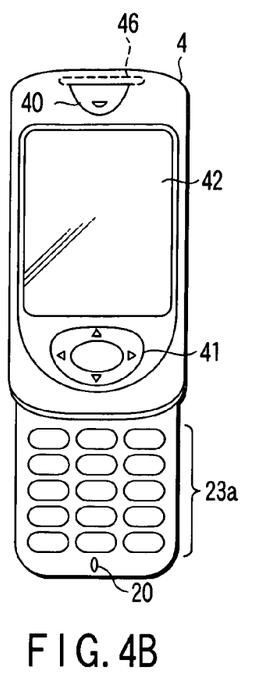
Figure 4C:
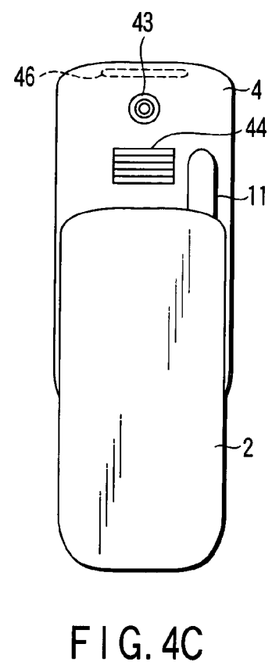

FIG. 4A is a side view of the portable information terminal when the second unit 4 is slid upward in the longitudinal direction with respect to the first unit 2 and is locked at the open position. FIGS. 4B and 4C are respectively a front view and a rear view thereof.

The second unit 4 has a nearly flat shape, and is provided with the display unit 42, sub input unit 41, and loudspeaker 40 on its surface side. Also, on the rear surface side of the second unit 4, i.e., on the surface that opposes the first unit 2 when the second unit is located at the close position shown in FIGS. 2A to 2C, the photographing unit 43 and flash 44 are provided. The photographing unit 43 is arranged at a position where it is exposed from the rear surface of the first unit 3 and is usable when the second unit 4 is locked at the intermediate position, as shown in FIGS. 3A to 3C. The flash 44 is arranged at a position where it is exposed from the rear surface of the first unit 3 and is usable when the second unit 4 is locked at the open position, as shown in FIGS. 4A to 4C.

Figure 5A:
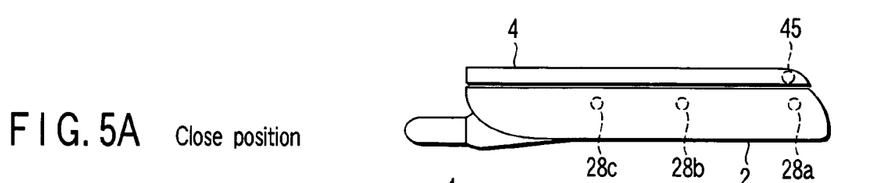
FIGS. 5A, 5B, and 5C are views for explaining the mounting positions of a magnet 45 and magnetic sensors 28a, 28b, and 28c, and the lock positions of the second unit 4 in the embodiment of the present invention.
Figure 5B:
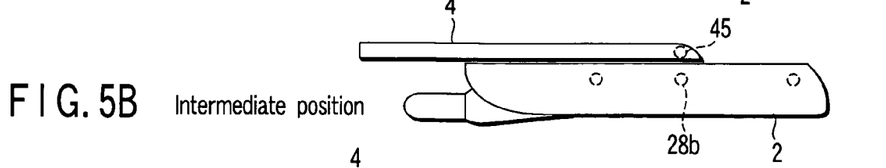
Figure 5C:
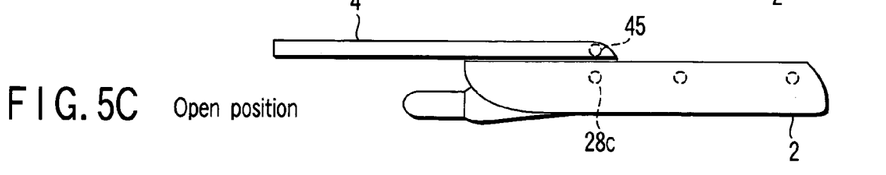

The second unit 4 has the magnet 45 near its end position so as to detect the slide positions, as shown in FIGS. 5A to 5C. The first unit 2 has the plurality of magnetic sensors 28a, 28b, and 28c at positions that oppose the magnet 45 provided to the second unit 4 in correspondence with the lock positions of the second unit 4. The magnetic sensor 28a detects the close position of the second unit 4, and the magnetic sensors 28b and 28c respectively detect the intermediate and close positions.

Although not shown, the first and second units 2 and 4 have lock mechanisms to lock the second unit 4 at the open, intermediate, and close positions when the second unit 4 is slid. The positions of the lock mechanisms match the positions where the magnetic sensors 28a, 28b, and 28c are arranged. Each lock mechanism has a structure that mechanically engages the two units, and releases the engaging state and easily allows a slide operation when the second unit 4 is slid by acting a predetermined force or more. Therefore, when the second unit 4 is slid from the close position shown in FIGS. 2A to 2C to the intermediate position shown in FIGS. 3A to 3C and is locked, that state can be maintained. Also, the second unit 4 can be slid from the close position to the open position shown in FIGS. 4A to 4C without being locked at the intermediate position.

The first unit 2 has nearly the same flat shape as the second unit 4, and the second unit 4 is slidably mounted on the first unit 2. The first unit 2 has the main input unit 23 and microphone 20 on the lower portion of its front-side surface. When the second unit 4 is slid to the open position, the main input unit 23 is exposed, and the distance between the microphone 20 and loudspeaker 40 becomes suited to talk, as shown in FIG. 3B, thus allowing various operations and voice communications.

On the other hand, when the second unit 4 is located at the close position, the rear surface of the second unit 4 opposes the front surface of the first unit 2 to cover it. Therefore, the photographing unit 43 and flash 44 provided on the rear surface of the second unit 4 and the main input unit 23 of the first unit 2 are protected by each other's units. Also, any operation mistake on the main input unit 23 can be prevented.

Note that the sub input unit 41 is provided on the front surface side of the second unit 4. In a state wherein the second unit 4 is located at the close position, operations associated with the display contents of the display unit 42, e.g., an e-mail operation, image operation, or call termination operation can always be made while visually confirming the display content.

With the portable information terminal of this embodiment, when a call is received while the second unit 4 is located at the close position and the user slides the second unit 4 to the open position, the position detection unit 22c detects the slide operation, and the control unit 22 automatically sets an off-hook state to allow the user to talk. At the same time, the informing operation by the informing unit 24 is stopped. When the second unit 4 is already set in the open state upon reception of a call, and the user makes an operation to a talk start key of the main input unit 23, an off-hook state is set to allow the user to talk.

On the other hand, when the user slides the second unit 4 to the close position upon completion of talking, the position detection unit 22 detects that slide operation, and the control unit 22 automatically sets an on-hook state (call-ending process). When the user makes an operation to a talk end key of the main input unit 23 while the second unit 4 is located at the open position, an on-hook state is set to similarly execute a call-ending process.

In the portable information terminal of this embodiment, upon reception of a call, an off-hook state is set by sliding the second unit 4 to the open position to allow the user to talk. Also, an on-hook state is set by sliding the second unit 4 to the close position, thus ending a call. In this embodiment, various functions provided to the portable information terminal can be launched by the slide operation of the second unit 4.

The operation of the portable information terminal of this embodiment will be described below.

Figure 6:
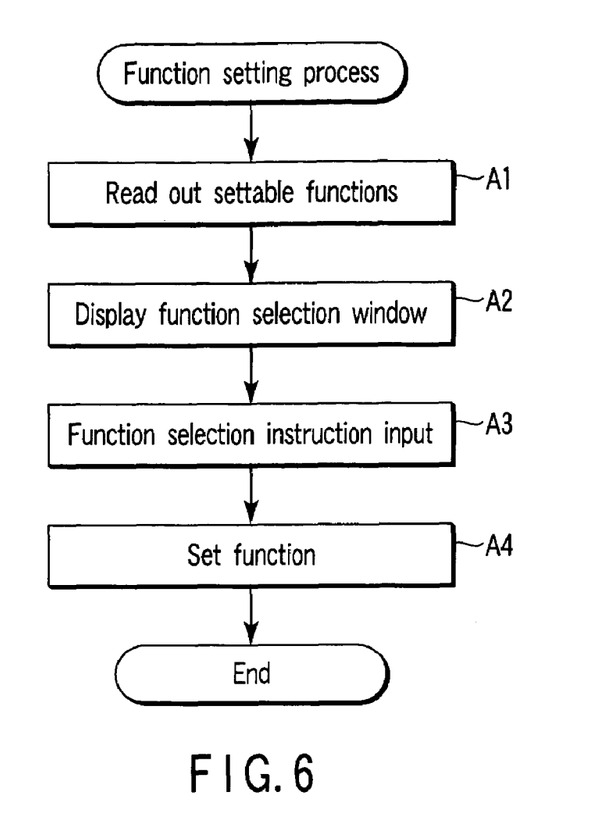
FIG. 6 is a flowchart for explaining a function setting process in the embodiment of the present invention.

The function setting process will be described first with reference to the flowchart shown in FIG. 6.

The portable information terminal has various S functions, which can be launched and executed in accordance with a user's instruction. In this embodiment, when the second unit 4 is slid and locked at the intermediate position, a function, which is set in advance, can be automatically launched.

Figure 7:
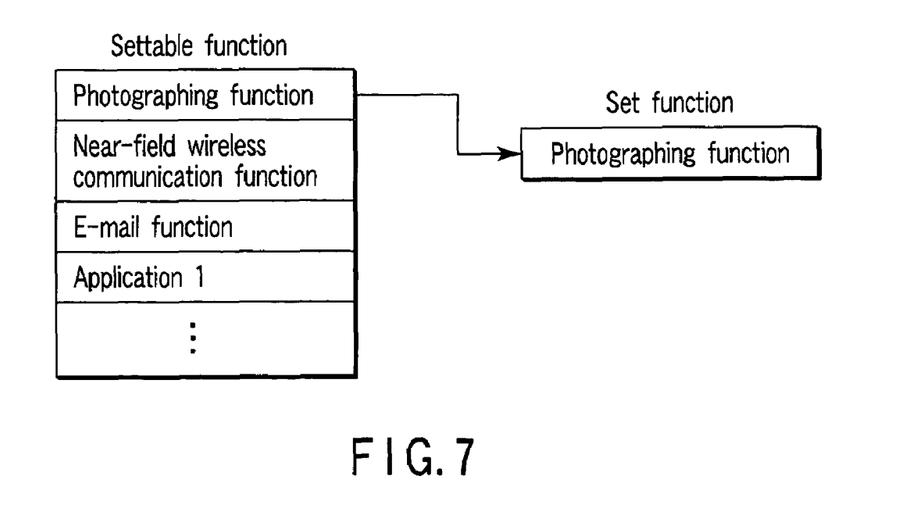
FIG. 7 is a view for explaining the function setting process in the embodiment of the present invention.

The portable information terminal of this embodiment is prepared with, as functions that can be launched by the slide operation of the second unit 4, a plurality of functions such as a photographing function, near-field wireless communication, e-mail function, application 1, and the like, as shown in FIG. 7. Application 1 includes functions which the user can arbitrarily run upon downloading them, such as a game, map (navigation), image playback, network (Web site) connection, and the like, in addition to functions which are installed in advance in the portable terminal such as a calendar function, schedule function, and the like.

The function setting unit 22a of the control unit 22 holds information associated with these various functions.

If an execution request of the function setting process is input by, e.g., an operation to the main input unit 23 or sub input unit 41 or the like, the function setting unit 22a of the control unit 22 reads out information associated with these settable functions (step A1), and displays a list of these functions in a function select window on the display unit 42 (step A2). For example, in the example shown in FIG. 7, the photographing function, near-field wireless communication, e-mail function, application 1, ... are displayed as a list.

On this list display window, the user can move a cursor by operating, e.g., the cross-cursor keys of the sub input unit 41 and can designate an arbitrary function. If the user designates one of these functions and inputs a select instruction (step A3), the function setting unit 22a sets the corresponding function as a function to be launched (step A4).

For example, FIG. 7 illustrates that the photographing function is set. When the photographing function is set as a function to be launched upon locking the second unit 4 at the intermediate position, a flash function is set for the open position in correspondence with this photographing function. That is, the flash function is set as a function to be automatically launched in correspondence with a change in position (slide direction) of the second unit 4 from the intermediate position to the open position (see FIG. 9).

In this embodiment, only a combination of the photographing function and flash function will be explained. Also, combinations of other functions can be set in correspondence with the slide direction (change in position of the second unit 4). Functions can be set not only for a change from the intermediate position to the open position, but also for a change in position (slide direction) from the intermediate position to the close position.

In this manner, since the user can arbitrarily select and set a function from a plurality of settable functions, a function to be launched by the slide operation of the second unit 4 can be arbitrarily set in correspondence with the use pattern or favor of each user.

In the above description, the function to be launched upon locking the second unit 4 at the intermediate position is set. Also, functions to be launched when the second unit 4 is slid to the open and close positions can be set.

Figure 8:
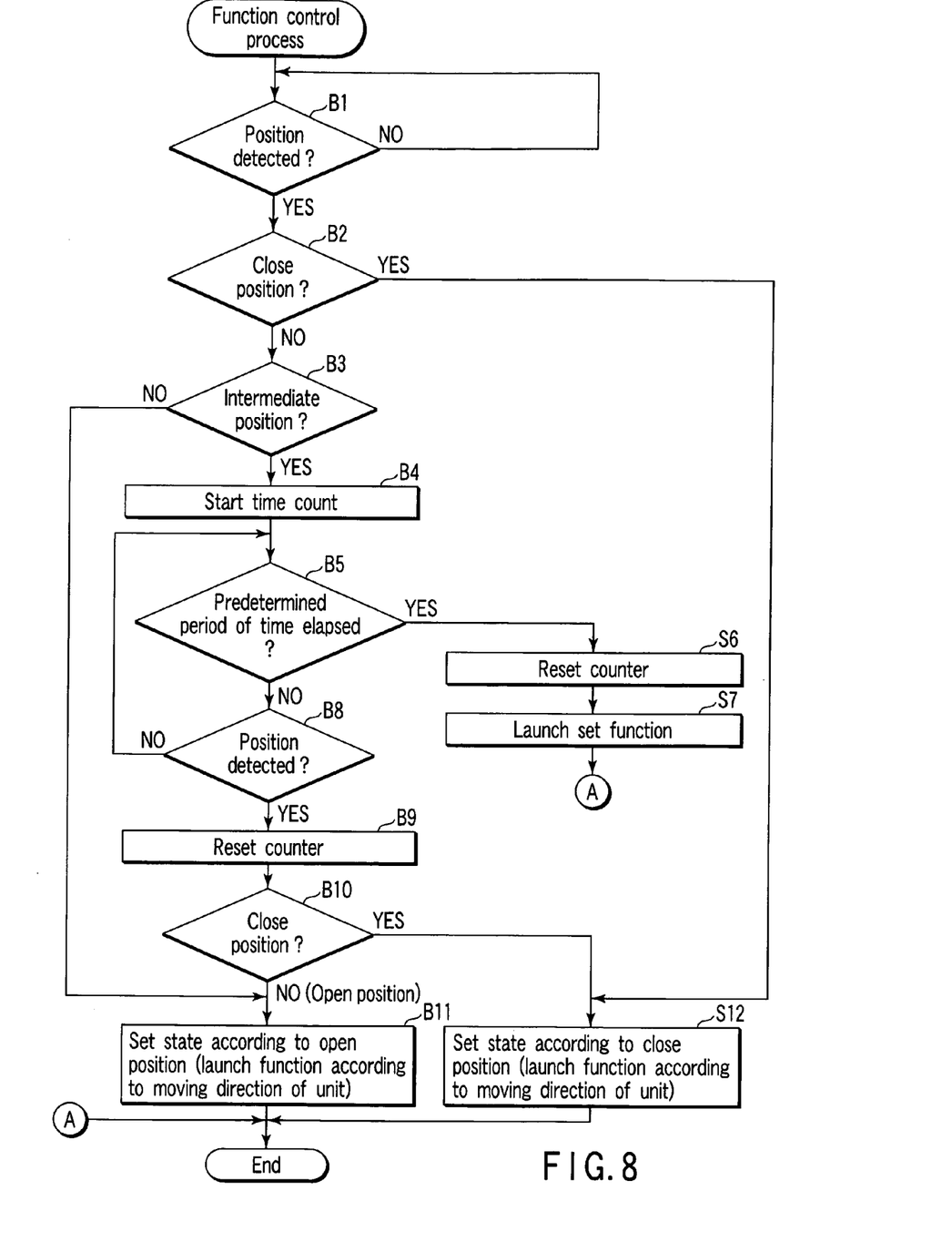
FIG. 8 is a flowchart for explaining a function control process in the embodiment of the present invention.

The function control process that launches the function set by the function setting process will be described below with reference to the flowchart shown in FIG. 8.

The position detection unit 22c always monitors a position where the second unit 4 is slid and locked, on the basis of the outputs from the magnetic sensors 28a, 28b, and 28c (step B1). If the position detection unit 22c detects the position based on the outputs from the magnetic sensors 28a, 28b, and 28c, it notifies the function control unit 22b of it.

If the position detection unit 22c has detected the position upon sliding the second unit 4 (step B1), the function control unit 22b determines the current state of the second unit 4, i.e., one of the open, intermediate, and close positions based on the detected position (step B2, B3).

For example, assume that the second unit 4 is slid to the intermediate position when it is located at the close position (YES in step B3). In this case, the function control unit 22b starts counting using a counter which is used to measure a time for which the second unit 4 remains locked at the intermediate position (step B4). The function control unit 22b checks if a predetermined period of time for which the second unit 4 remains located at the intermediate position has elapsed (steps B5 and B8).

If the position detection unit 22c detects another position before an elapse of the predetermined period of time (YES in step B8), the control unit 22b resets the counter (step B9).

If the position detected by the position detection unit 22c is based on the output from the magnetic sensor 28c, i.e., if the second unit 4 is further slid to the open position beyond the intermediate position (NO in step B10), the function control unit 22b sets a state corresponding to the open position (step B11). For example, when the function to be launched in correspondence with the open position is set, the unit 22b launches that function. If the slide operation is that for the second unit 4 upon reception of a call, the unit 22b sets an off-hook state to connect a line, so as to allow the user to talk.

Figure 9:
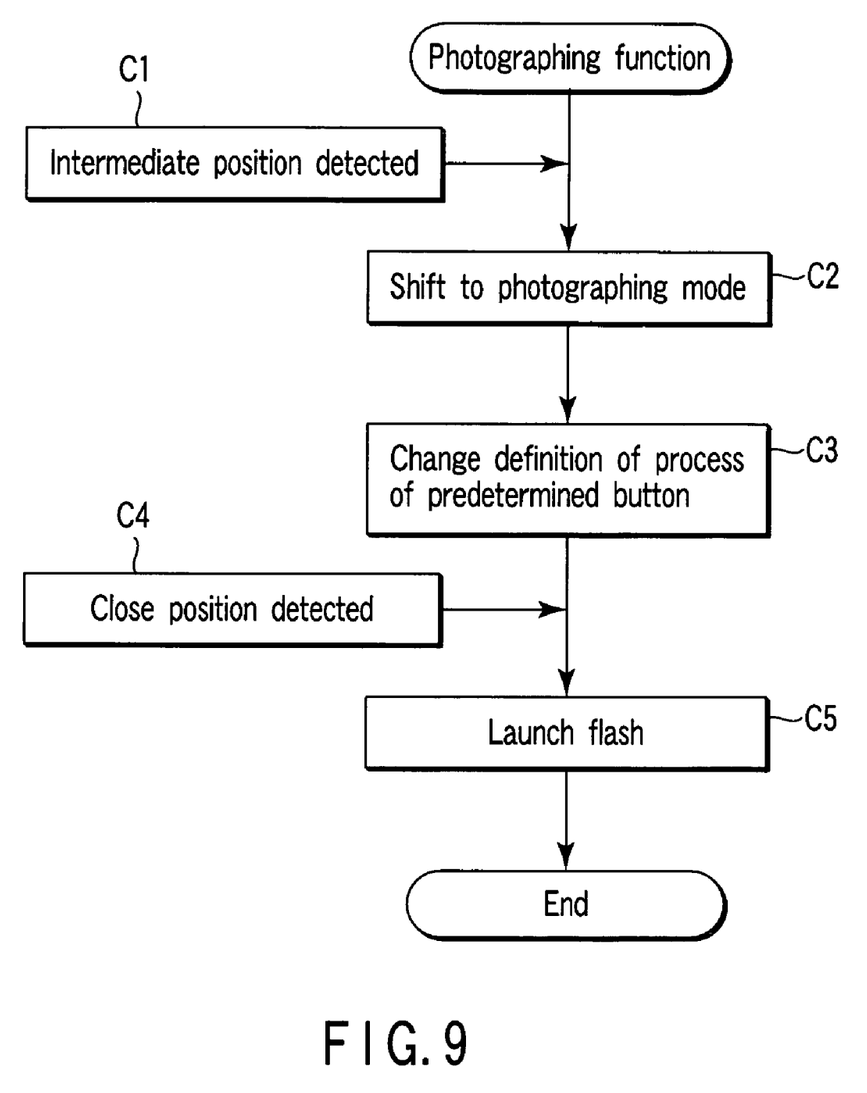
FIG. 9 is a flowchart for explaining an operation upon automatically launching a photographing function and flash function set by the function setting process in the embodiment of the present invention.

If the second unit 4 is slid from the intermediate position to the open position (NO in step B3), and if another function has already been automatically launched upon sliding the second unit 4 to the intermediate position, the function control unit 22b launches a function at the open position corresponding to the launched function. A practical example will be described later taking the photographing function as an example (FIG. 9).

On the other hand, if the position detected by the position detection unit 22c is based on the output from the magnetic sensor 28a, i.e., if the second unit 4 is adversely slid from the intermediate position to the close position (YES in step B10), the function control unit 22b sets a state corresponding to the close position (step B12). For example, when a function to be launched in correspondence with the close position is set, the unit 22b launches that function.

If the second unit 4 is slid from the intermediate position to the close position (NO in step B2), and if another function has already been automatically launched upon sliding the second unit 4 to the intermediate position, the function control unit 22b launches a function at the close position corresponding to the launched function, or aborts the automatically launched function.

If the lock state of the second unit 4 at the intermediate position continues for a predetermined period of time (YES in step B4), the function control unit 22b resets the counter (step B6), and automatically launches a function set for the intermediate position (step B7).

For example, as has been explained using FIG. 7, if the photographing function is set as a function to be launched, the function control unit 22b launches the image processing unit 26 to allow a photographing operation of the photographing unit 43. When the second unit 4 is located at the intermediate position, since the photographing unit 43 is exposed from the rear surface side of the first unit 2, as shown in FIG. 3C, a photographing operation is also allowed in terms of the current shape of the portable information terminal.

In this way, by locking the second unit 4 at the intermediate position for a predetermined period of time, the function set by the function setting process can be automatically launched. Therefore, the operability can be improved since no normal launch operation is required. Since the user can arbitrarily set the function to be launched in advance by the function setting process, use suited to user's preference can be made. Since the user need only slide the second unit 4 to the intermediate position, operation becomes simpler than the slide operation from the close position to the open position, and the portable information medium need not have an excessively large shape as a whole, thus allowing easy handling. Furthermore, since detection at the intermediate position is invalidated for a predetermined period of time, the set function can be prevented from being launched every time the position of the second unit 4 is detected at the intermediate position upon sliding the second unit 4 from, e.g., the close position to the open position (or vice versa).

The operation upon automatically launching the photographing function and flash function set by the function setting process will be described below with reference to the flowchart shown in FIG. 9.

If the aforementioned function control process detects that the second unit 4 has been locked at the intermediate position for a predetermined period of time (step C1), the function control unit 22b launches the photographing function to start a photographing mode (step C2).

The control unit 22 changes predetermined definitions of predetermined ones of a plurality of buttons provided to the main input unit 23 (step C3). For example, if the second unit 4 is located at the intermediate position, some buttons 23a of a plurality of buttons provided to the main input unit 23 are operable, as shown in FIG. 3B. The control unit 22 sets for these buttons 23a processes to be executed by input operations to the operation buttons so as to allow the user to use the currently, automatically launched function (photographing function in this case). That is, the control unit 22 assigns functions associated with photographing to these buttons. The control unit 22 executes a process according to the assigned function upon detection of an input operation to one of these buttons.

When the photographing mode starts, the image processing unit 26 receives an image photographed by the photographing unit 43, and displays a through image on the display unit 42 to serve as an electronic viewfinder under the control of the control unit 22.

When a photographing execution instruction (e.g., a still image) is input by an operation to the main input unit 23 or sub input unit 41, the control unit 22 records still image data input via the image processing unit 26, and displays the photographed image on the display unit 42.

On the other hand, assume that the second unit 4 is further slid to the open position in a state wherein the photographing function is automatically launched upon detection of the second unit 4 at the intermediate position (step C4). In this case, for a slide operation from the intermediate position to the open position, automatic launch of a flash function is set in association with the photographing function set for the intermediate position.

The function control unit 22b launches the flash control unit 27 upon detection of the position by the position detection unit 22c to allow to emit flash light upon photographing a still image by the image processing unit 26 (step C5). When the second unit 4 is located at the open position, the flash 44 is exposed from the rear surface side of the first unit 2 together with the photographing unit 43, as shown in FIG. 4C, so as to allow flash light emission in terms of the shape of the portable information terminal.

Upon input of a photographing execution instruction of a still image by an operation to the main input unit 23 or sub input unit 41, the control unit 22 controls the flash control unit 27 to emit flash light and inputs a still image via the image processing unit 26. The control unit 22 records the input still image data, and displays the photographed image on the display unit 42.

In this manner, by sliding the second unit 4 from the intermediate position to the open position, the flash function associated with the photographing function which is set for the intermediate position as a function to be launched can be automatically launched. For example, by simply sliding the second unit 4 from the close position to the open position, the flash function is not launched. However, after the photographing function is launched at the intermediate position, the second unit 4 is slid to the open position to enable the flash function without any special operation.

In the above description, the photographing function and flash function have been exemplified. By setting combinations of other different processes in correspondence with the lock position of the second unit 4, respective processes can be launched in turn in correspondence with the slide directions of the second unit 4, as described above.

For example, an e-mail message creation function is executed by key operations to the main input unit 23 while the second unit 4 is located at the open position. By sliding the second unit 4 from the open position to the intermediate position, and locking it for a predetermined period of time, the e-mail message is automatically submitted. Furthermore, by sliding the second unit 4 to the close position, the process associated with the e-mail message ends.

In this manner, in the portable information terminal according to this embodiment, functions corresponding to the lock positions of the second unit 4 can be arbitrarily set by executing the function setting process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A portable terminal comprising:
    a first unit;
    a second unit;
    an engaging mechanism configured to engage the second unit such that the second unit is movable with respect to the first unit;
    a first locking mechanism configured to lock the second unit, moved by the engaging mechanism, in a first lock position falling within a movable range;
    a second locking mechanism configured to lock the second unit, moved by the engaging mechanism, in a second lock position differing from the first lock position;
    a first position detection unit configured to detect whether the second unit is locked in the first lock position by the first locking mechanism;
    a second position detection unit configured to detect whether the second unit is locked in the second lock position by the second locking mechanism;
    a time measuring unit configured to measure a time during which the first position detection unit detects that the second unit is in the first lock position; and
    a function control unit configured to activate one of a first function unit and a second function unit different from the first function unit when the second unit is in the second lock position after the first position detection unit detects that the second unit is in the first lock position, the first function unit being activated when the second position detection unit detects that the second unit is in the second lock position before the time measured by the time measuring unit exceeds a preset value, the second function unit being activated when the second position detection unit detects that the second unit is in the second lock position after the time measured by the time measuring unit exceeds the preset value.

2. The portable terminal according to claim 1, further comprising:
    an input unit including an operation button; and
    an input setting unit configured to set a process to be executed by an input operation to the operation button in correspondence with the function unit to be launched by the second control unit.

3. The portable terminal according to claim 1, further comprising:
    an input unit including an operation button; and
    an input processing unit configured to change a process to be executed, when the operation button is operated.

4. The portable terminal according to claim 1, further comprising a direction detection unit configured to detect a direction in which the second unit is moved, based on a change in the lock position of the second unit detected by the first and second position detection units, and wherein the function control unit activates the first or second function unit in accordance with the direction detected by the direction detection unit.

5. The portable terminal according to claim 1, wherein:
    the function control unit activates an image photographing function unit after the preset time elapses from a time when the first position detection unit has detected that the second unit is in the first lock position; and
    the function control unit activates a flash function unit when the second position detection unit has detected that the second unit is in the second lock position, after the preset time elapses from the time when the first position detection unit has detected that the second unit is in the first lock position.

6. A portable terminal comprising:
    a first unit;
    a second unit;
    an engaging mechanism configured to engage the second unit such that the second unit is slidable with respect to the first unit;
    a first locking mechanism configured to lock the second unit, slid by the engaging mechanism, in a first lock position falling within a slidable range;
    a second locking mechanism configured to lock the second unit, slid by the engaging mechanism, in a second lock position differing from the first lock position;
    a first position detection unit configured to detect whether the second unit is locked in the first lock position by the first locking mechanism;
    a second position detection unit configured to detect whether the second unit is locked in the second lock position by the second locking mechanism;
    a time measuring unit configured to measure a time during which the first position detection unit detects that the second unit is in the first lock position; and
    a function control unit configured to activate one of a first function unit and a second function unit different from the first function unit when the second unit is in the second lock position after the first position detection unit detects that the second unit is in the first lock position, the first function unit being activated when the second position detection unit detects that the second unit is in the second lock position before the time measured by the time measuring unit exceeds a preset value, the second function unit being activated when the second position detection unit detects that the second unit is in the second lock position after the time measured by the time measuring unit exceeds the preset value.

7. The portable terminal according to claim 6, further comprising:
    an input unit including an operation button; and
    an input processing unit configured to change a process to be executed, when the operation button is operated.

8. The portable terminal according to claim 7, further comprising a direction detection unit configured to detect a direction in which the second unit is moved, based on a change in the lock position of the second unit detected by the first and second position detection units, and wherein the function control unit activates the first or second function unit in accordance with the direction detected by the direction detection unit.

9. The portable terminal according to claim 7, further comprising a direction detection unit configured to detect a direction in which the second unit is slid, based on a change in the lock position of the second unit detected by the first and second position detection units, and wherein the function control unit activates the first or second function unit in accordance with the direction detected by the direction detection unit.

10. The portable terminal according to claim 6, further comprising a direction detection unit configured to detect a direction in which the second unit is slid, based on a change in the lock position of the second unit detected by the first and second position detection units, and wherein the function control unit activates the function unit in accordance with the direction detected by the direction detection unit.

11. The portable terminal according to claim 6, wherein:
the function control unit activates an image photographing function unit after the preset time elapses from a time when the first position detection unit has detected that the second unit is in the first lock position; and
the function control unit activates a flash function unit when the second position detection unit has detected that the second unit is in the second lock position, after the preset time elapses from the time when the first position detection unit has detected that the second unit is in the first lock position.

\* \* \* \* \*

UNITED STATES PATENT AND TRADEMARK OFFICE
CERTIFICATE OF CORRECTION

| | | |
|---|---|---|
| PATENT NO. | : 7,672,700 B2 | Page 1 of 1 |
| APPLICATION NO. | : 10/932075 | |
| DATED | : March 2, 2010 | |
| INVENTOR(S) | : Oda | |

It is certified that error appears in the above-identified patent and that said Letters Patent is hereby corrected as shown below:

Title page, column 1, between items (65) and (51), insert:

Item --(30)    Foreign Application Priority Data

Mar. 22, 2004   (JP)    ................... 2004-083582--.

Signed and Sealed this

Twenty-seventh Day of April, 2010

David J. Kappos
*Director of the United States Patent and Trademark Office*